US010793142B2

(12) United States Patent
Nordbruch

(10) Patent No.: US 10,793,142 B2
(45) Date of Patent: *Oct. 6, 2020

(54) SERVER FOR OPERATING A PARKING FACILITY

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 61 days.

This patent is subject to a terminal disclaimer.

(21) Appl. No.: 15/523,720

(22) PCT Filed: Oct. 22, 2015

(86) PCT No.: PCT/EP2015/074453
§ 371 (c)(1),
(2) Date: May 2, 2017

(87) PCT Pub. No.: WO2016/083028
PCT Pub. Date: Jun. 2, 2016

(65) Prior Publication Data
US 2017/0313307 A1 Nov. 2, 2017

(30) Foreign Application Priority Data
Nov. 26, 2014 (DE) .......................... 10 2014 224 073

(51) Int. Cl.
*B60W 30/06* (2006.01)
*G08G 1/14* (2006.01)
(Continued)

(52) U.S. Cl.
CPC ............. *B60W 30/06* (2013.01); *G01C 21/20* (2013.01); *G05D 1/0212* (2013.01);
(Continued)

(58) Field of Classification Search
CPC ... B62D 15/0285; B60W 30/06; G01C 21/20; G05D 1/0212
See application file for complete search history.

(56) References Cited

U.S. PATENT DOCUMENTS

2001/0019309 A1   9/2001   Saeki et al.
2003/0074129 A1*  4/2003   Curbow ................. G01C 21/26
                                                    701/523
(Continued)

FOREIGN PATENT DOCUMENTS

DE   102008011290 A1   9/2009
DE   102012222562 A1   6/2014
(Continued)

OTHER PUBLICATIONS

International Search Report dated Jan. 4, 2016, of the corresponding International Application PCT/EP2015/07445 filed Oct. 22, 2015.

*Primary Examiner* — Abby Y Lin
*Assistant Examiner* — Renee LaRose
(74) *Attorney, Agent, or Firm* — Norton Rose Fulbright US LLP; Gerard Messina

(57) ABSTRACT

The invention relates to a server for operating a parking facility, including: —a database in which a digital map of a parking facility is stored, —a processor which is designed for ascertaining at least one target position for a vehicle in the parking facility and at least one section of the digital map which corresponds to a portion of the parking facility, through which the vehicle is to drive autonomously during its driving operation to the target position, and —a communication interface which is designed for transmitting the section of the digital map and the target position to the vehicle via a communication network. The invention further relates to a method for operating a parking facility, to a
(Continued)

Figure 1:
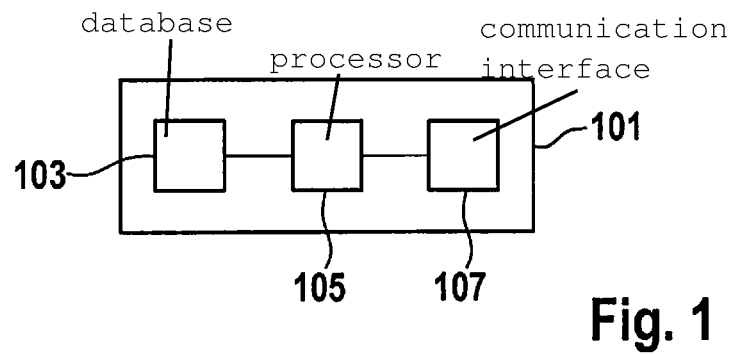

device and a method for operating a vehicle, to a vehicle, a parking system, and a computer program.

18 Claims, 4 Drawing Sheets

(51) Int. Cl.
    *G01C 21/20*     (2006.01)
    *G05D 1/02*     (2020.01)
    *H04L 29/08*     (2006.01)

(52) U.S. Cl.
    CPC ........... *G05D 1/0282* (2013.01); *G08G 1/143* (2013.01); *G08G 1/146* (2013.01); *G08G 1/147* (2013.01); *H04L 67/12* (2013.01); *G05D 2201/0213* (2013.01)

(56) References Cited

U.S. PATENT DOCUMENTS

| | | |
|---|---|---|
| 2006/0036364 A1 | 2/2006 | Matsuo et al. |
| 2012/0188100 A1* | 7/2012 | Min ................. G08G 1/143 |
| | | 340/932.2 |
| 2015/0346727 A1* | 12/2015 | Ramanujam ....... B62D 15/0285 |
| | | 701/23 |
| 2016/0116293 A1* | 4/2016 | Grover .................. G01C 21/34 |
| | | 701/23 |

FOREIGN PATENT DOCUMENTS

| | | |
|---|---|---|
| EP | 1555511 A1 | 7/2005 |
| JP | 2005010060 A | 1/2005 |
| JP | 2007233771 A | 9/2007 |
| JP | 2011163951 A | 8/2011 |
| JP | 2014137743 A | 7/2014 |

\* cited by examiner

SERVER FOR OPERATING A PARKING FACILITY

The present invention relates to a server for operating a parking facility. The present invention further relates to a method for operating a parking facility. Moreover, the present invention relates to a device and a method for operating a vehicle. The present invention relates to a vehicle and a computer program.

BACKGROUND INFORMATION

In a case of fully automated (autonomous) so-called valet parking, a vehicle is parked by its driver at a drop-off position, for example, in front of a parking garage, and, from there, the vehicle drives itself into a parking position/parking space and, from there, back to the drop-off position.

Known navigation systems generally do not include digital maps of parking facilities, so that an autonomous vehicle navigation within a parking facility is made difficult or is not possible.

Digital maps of a parking facility generally require a considerable amount of memory. A transmission of such a digital map via a communication network therefore takes a considerable amount of time, depending on an available bandwidth.

The unexamined patent application JP 002007233771 A describes a parking robot as a pilot which pilots a vehicle to a parking facility. The vehicle automatically follows the parking robot.

The unexamined patent application DE 10 2012 222 562 A1 describes a system for managed parking areas for transferring a vehicle from a start position into a target position.

SUMMARY OF THE INVENTION

The object underlying the present invention may be considered that of providing a concept, with the aid of which a navigation of the vehicle in the parking facility may be made possible, a memory required therefor and/or an available data transmission bandwidth being able to be efficiently utilized via a communication network.

This object is achieved with the aid of the particular subject matter of the independent claims. Advantageous embodiments of the present invention are the subject matter of particular dependent subclaims.

According to one aspect, a server for operating a parking facility is provided, including:
  a database in which a digital map of a parking facility is stored,
  a processor which is designed for ascertaining at least one target position for a vehicle in the parking facility and at least one section of the digital map which corresponds to a portion of the parking facility, through which the vehicle is to drive autonomously during its driving operation to the target position, and
  a communication interface which is designed for transmitting the section of the digital map and the target position to the vehicle via a communication network.

According to yet another aspect, a method for operating a parking facility is provided, in which
  at least one target position for a vehicle in the parking facility and at least one section of the digital map, which corresponds to a portion of the parking facility, through which the vehicle is to drive autonomously during its driving operation to the target position, is ascertained based on a digital map of a parking facility,
  the section of the digital map and the target position are transmitted to the vehicle via a communication network.

According to yet another aspect, a parking system for vehicles is provided, the parking system including a parking facility and the server for operating a parking facility.

According to yet another aspect, a device for operating a parking facility is provided, including:
  a communication interface which is designed for receiving, via a communication network, at least one target position for the vehicle in the parking facility and at least one section of a digital map of the parking facility, which corresponds to a portion of the parking facility, through which the vehicle is to drive autonomously during its driving operation to the target position, and
  a guide unit which is designed for autonomously guiding the vehicle in the parking facility through the portion to the target position.

According to yet another aspect, a vehicle is provided, which includes the device for operating a vehicle.

According to yet another aspect, a computer program is provided, which includes program code for carrying out the method according to the present invention when the computer program is run on a computer.

The present invention therefore includes the idea, in particular, of transmitting at least one section of a digital map of the parking facility via a communication network, the section corresponding to a portion of the parking facility, through which the vehicle is to drive autonomously on its route or on its trip to the target position. This means that the entire digital map is not transmitted to the vehicle. This is the case because, generally, the vehicle does not need the entire digital map in order to drive or navigate to its target position. If the target position, for example, is located in the second floor of a parking garage, map sections of the fourth floor are not relevant for a trip by the vehicle to the target position in the second floor and are not required by the vehicle. This yields the technical advantage, in particular, that a data volume to be transmitted to the vehicle may be reduced. In particular, the vehicle no longer needs to reserve or provide memory space for the entire digital map of the vehicle. The memory in the vehicle for map data may therefore be reduced.

A parking facility within the scope of the present invention may also be referred to as a parking area and is used as an area for parking vehicles. The parking facility therefore forms, in particular, one contiguous area which includes multiple parking spaces (in the case of a parking facility on private property) or parking zones (in the case of a parking facility on public property). According to one specific embodiment, the parking facility may include a parking deck. In particular, the parking facility includes a parking garage.

"Autonomously" within the scope of the present invention means, in particular, that the vehicle navigates automatically, i.e., without any intervention by a driver. The vehicle therefore automatically drives in the parking facility without a driver needing to steer the vehicle or needing to be located in the vehicle for this purpose. This therefore means, in particular, that the guide unit for the navigation and/or for the guidance autonomously guides the vehicle. A guidance includes, in particular, a transverse guidance and/or a longitudinal guidance of the vehicle. In the case of autonomous driving or navigating, the driver him/herself therefore does not need to be in the vehicle. Such an autonomously driving vehicle, which may automatically park and unpark, is referred to, for example, as an AVP vehicle. AVP stands for "automatic valet parking" and may be referred to as "automatic parking process". Vehicles which do not have this AVP functionality are referred to as normal vehicles, for example.

A drop-off position within the scope of the present invention is a position at which a driver of the vehicle may drop off his/her vehicle for an autonomous parking process and at which the driver may pick up his/her vehicle at a later point in time.

A parking position within the scope of the present invention is a position at which the vehicle is to autonomously park.

A pick-up position within the scope of the present invention is a position at which a vehicle may be picked up after an end of an autonomous parking process.

According to one specific embodiment, the drop-off position is identical to the pick-up position.

In one specific embodiment, it is provided that the vehicle autonomously navigates or drives from the drop-off position to the parking position.

In yet another specific embodiment, it is provided that the vehicle autonomously parks in the parking position.

In yet another specific embodiment, it is provided that the vehicle autonomously unparks from the parking position.

According to yet another specific embodiment, it is provided that the vehicle autonomously navigates or drives from the parking position to the drop-off position.

According to one specific embodiment, it is provided that the portion is formed as one contiguous area extending from a start position to the target position. As a result, this yields the technical advantage, in particular, that even more information is available to the vehicle, based on which the vehicle may autonomously drive to the target position. As a result, in particular, a more efficient navigation or autonomous driving operation by the vehicle to the target position is effectuated.

According to one specific embodiment, the portion includes the target position.

According to yet another specific embodiment, it is provided that the processor is designed for subdividing the section into subsections, each of which corresponds to one sub-portion of the portion, the communication interface being designed for transmitting at least some of the subsections via the communication network only during the autonomous driving operation by the vehicle to the target position, the at least some subsections corresponding to sub-portions through which the vehicle must still drive during its autonomous driving operation to the target position.

As a result, this yields the technical advantage, in particular, that the vehicle does not need to provide or reserve an appropriate memory space all at once for the entire portion. This is the case because at least some of the portions through which the vehicle will drive during its autonomous driving operation are transmitted to the vehicle only during its driving operation. This means, therefore, that the vehicle has already driven through some of the portions. The vehicle may therefore delete the subsections corresponding to these portions from an electronic memory, which is also provided according to one specific embodiment.

According to yet another specific embodiment, it is provided that the processor is designed for ascertaining the subsections with a different accuracy depending on a distance of the vehicle to a particular sub-portion during its autonomous driving operation.

As a result, this may yield the technical advantage, in particular, that a memory requirement for a storage of the transmitted subsections may be reduced. This is the case because subsections having a reduced accuracy as compared to other subsections also require less memory relative thereto. The closer the vehicle comes to a certain portion, the more accurate the corresponding subsection should be, so that the vehicle may reliably autonomously drive or navigate through the corresponding portion. The further away the vehicle is from a corresponding portion, the less accurate a corresponding subsection may be. This is the case because the vehicle must initially drive through other portions before it reaches this portion. Rough information on such remote portions generally suffices for planning and carrying out the autonomous trip.

For example, one subsection includes the piece of information that an area contains not only the subsection, i.e., for example, one further portion, but also a lane in which vehicles may drive. The vehicle therefore knows that it has space for maneuvering in addition to the subsections, if necessary.

The vehicle does not necessarily need to know whether this lane is 2.87 m wide, i.e., in general how wide the lane is. For a navigation and planning, it suffices that the lane is known and that vehicles may be encountered there.

According to one specific embodiment, it is provided that the subsection which corresponds to a portion directly following the portion, through which the vehicle will drive after this portion, is transmitted to the vehicle with high accuracy.

Differences in the accuracy are, for example, as follows:

In the case of low accuracy, for example, only objects are indicated (for example, that a lane is present).

In the case of low accuracy, for example, only normal widths (for example, for a lane in a road), which are already permanently stored in the vehicle, for example, and/or which are known to the vehicle, are indicated and/or utilized.

In the case of high accuracy, for example, tolerances are additionally indicated.

In the case of low accuracy, for example, only width and/or height are indicated (i.e., a 2D view) for objects which the vehicle sees head-on.

In the case of high accuracy, for example, the depth information is transmitted in addition to the width and/or height (i.e., a 3D view).

In yet another specific embodiment, it is provided that the processor is designed for ascertaining at least one further section of the digital map which corresponds to one further portion of the parking facility, past which the vehicle is to drive during its autonomous driving operation to the target position, the communication interface being designed for transmitting the further section to the vehicle via the communication network.

As a result, this yields the technical advantage, in particular, that additional information is available to the vehicle for its autonomous driving operation or navigation to the target position. This additional information corresponds to the further section. The vehicle will drive past this further section. The vehicle will not drive through this further section. Nevertheless, there may be situations in which it is necessary to have knowledge of this further portion for an improved and efficient navigation or autonomous driving operation of the vehicle to the target position.

For example, during the planning, it is helpful to know whether the vehicle is driving past parking spaces/parking positions or a wall (on the right, for example). Vehicles may pull out of the parking positions. Not toward the wall. This means that the vehicle does not need to "watch out" toward closely at the wall. This means that a surroundings sensor system does not need to detect this area as precisely. This means that surroundings data from a surroundings sensor system do not need to be analyzed as precisely in this area.

For example, a situation may occur when there is a door in the wall through which pedestrians may emerge. In this case, it is then useful and intended that the knowledge includes the piece of information that there is a door in the wall, so that driver assistance systems of the vehicle may appropriately account for the wall including the door when carrying out its driver assistance functionality.

In yet another specific embodiment, it is provided that the processor is designed for ascertaining the further section with reduced accuracy as compared to the section.

A memory requirement may also be reduced as a result, similarly to the comments made in conjunction with the subsections having different accuracies. In particular, a data volume to be transmitted is reduced. Examples of differences in the accuracy are similar to the aforementioned examples.

In yet another specific embodiment, it is provided that the communication interface is designed for transmitting the further section to the vehicle via the communication network depending on a distance of the vehicle to the further section during its autonomous driving operation.

The comments made in conjunction with the subsections having different accuracies depending on a distance of the vehicle to the subsections also apply for this specific embodiment.

According to yet another specific embodiment, it is provided that the processor is designed for ascertaining a route to the target position, which lies within the parking facility and extends through the portion, based on the digital map, the communication interface being designed for transmitting the ascertained route to the vehicle via the communication network.

As a result, this yields the technical advantage in particular that the vehicle itself no longer needs to ascertain a route. The vehicle is relieved of this task, so to speak. Correspondingly, the vehicle may conserve computing capacities.

In yet another specific embodiment, it is provided that the at least one target position includes a drop-off position at which a driver of the vehicle may drop off his/her vehicle for an autonomous parking process, and/or a parking position at which the vehicle is to autonomously park, and/or includes a pick-up position at which a driver of the vehicle is to pick up his/her vehicle at the end of parking.

This means, therefore, that an entire automatic valet parking process, i.e., an autonomous parking process, may be carried out: The vehicle autonomously drives from a drop-off position to a parking position, autonomously parks there, autonomously unparks from this parking position at the end of a parking duration, and autonomously drives to a pick-up position which, according to one specific embodiment, corresponds to the drop-off position. For this autonomous driving operation to the individual positions, it is provided according to one specific embodiment that sections from the digital map of the parking facility are sent or transmitted to the vehicle via the communication network, these sections corresponding to portions of the parking facility through which the vehicle is to drive during its autonomous driving operation to the individual positions.

According to yet another specific embodiment of the device for operating a vehicle, it is provided that the communication interface is designed for receiving, via the communication network, subsections subdividing the section, each subsection corresponding to one sub-portion of the portion, the communication interface being designed for receiving at least some of the subsections via the communication network only during the autonomous driving operation of the vehicle to the target position, the at least some subsections corresponding to sub-portions through which the vehicle must still drive during its autonomous driving operation to the target position.

According to yet another specific embodiment of the device for operating a vehicle, it is provided that the communication interface is designed for receiving, via the communication network, at least one further section of the digital map, which corresponds to one further portion of the parking facility, past which the vehicle is to drive during its autonomous driving operation to the target position, the guide unit being designed for guiding the vehicle past the further section.

According to yet another specific embodiment of the device for operating the vehicle, it is provided that the at least one target position includes a drop-off position at which a driver of the vehicle may drop off his/her vehicle for an autonomous parking process, and/or a parking position at which the vehicle is to autonomously park, and/or includes a pick-up position at which a driver of the vehicle is to pick up his/her vehicle at the end of parking, the guide unit being designed for stopping and/or parking and/or unparking the vehicle at the corresponding positions.

According to one specific embodiment, it is provided that the vehicle is configured or designed for implementing or carrying out the method for operating a vehicle.

According to one specific embodiment, the device for operating a vehicle is designed or configured for implementing or carrying out the method for operating a vehicle.

In yet another specific embodiment, it is provided that the server for operating a parking facility is designed or configured for implementing or carrying out the method for operating a parking facility.

According to one specific embodiment, it is provided that the at least one target position includes a drop-off position at which a driver of the vehicle may drop off his/her vehicle for an autonomous parking process, and/or a parking position at which the vehicle is to autonomously park, and/or includes a pick-up position at which a driver of the vehicle is to pick up his/her vehicle at the end of parking.

As a result, this yields the technical advantage in particular that an autonomous parking process (valet parking) may be carried out in the parking facility. This therefore means, in particular, that the vehicle advantageously drives automatically, i.e., autonomously, from the drop-off position to the parking position, parks there, unparks at the end of a parking duration, and drives to the pick-up position which may be the drop-off position, for example.

According to one specific embodiment, several target positions are received by the vehicle via the communication network. The vehicle selects, from the received target positions, the target position to which the vehicle navigates.

According to one specific embodiment, it is provided that the vehicle receives at least one target position, in particular several target positions, via the communication network, the vehicle driving to the target position or the target positions depending on priorities assigned to the particular target position or target positions. This means the target positions each have a priority, in particular different priorities, the priorities specifying a sequence in which the vehicle is to drive to the target positions, it being provided, in particular, that the vehicle drives to the target positions according to the sequence.

In yet another specific embodiment, it is provided that a route to the target position lying within the parking facility is ascertained based on the digital map, the navigation or the guidance including following the route.

As a result, this yields the technical advantage in particular that the navigation may be carried out particularly efficiently, since the route to be followed has already been established. The vehicle therefore only needs to follow this route in order to arrive at the target position. This advantageously accelerates a navigation of the vehicle in the parking facility. In particular, it is advantageously made possible in this way that the vehicle may arrive at its target position more quickly.

In yet another specific embodiment, it is provided that the route is ascertained vehicle-externally and is transmitted to the vehicle via the communication network, or the route is ascertained vehicle-internally.

The vehicle-external ascertainment may be carried out, for example, according to one specific embodiment, with the aid of the server, more precisely with the aid of its processor. In order to carry out the vehicle-internal ascertainment of the route, according to one specific embodiment, the guide unit includes a processor which is suitably designed for ascertaining the route. A vehicle-external ascertainment yields the technical advantage, in particular that the vehicle itself need not reserve resources for this purpose. Generally, an external system, for example the server in this case, also has better knowledge of the traffic situation in the parking facility than the vehicle itself. In this way, the server may advantageously calculate a route which leads through the existing traffic preferably quickly and efficiently, so that stopped traffic or a traffic jam may be avoided. A vehicle-internal ascertainment of the route yields the technical advantage in particular that there does not need to be a connection to the server via the communication network for this purpose. In this way, the route may therefore be ascertained even if there is no connection to the server via the communication network. The vehicle is therefore independent of an external system, for example the server in this case, with respect to ascertaining the route.

In one specific embodiment, a route to the target position is ascertained both vehicle-externally and vehicle-internally, the route ascertained vehicle-externally then being transmitted to the vehicle via the communication network. The vehicle compares the two routes and decides which one to follow.

A route within the scope of the present invention includes a start position and the target position. The vehicle preferably navigates to the start position and, from there, follows the route to the target position. In particular, the start position corresponds to the drop-off position at which a driver may drop off his/her vehicle and leave his/her vehicle so that subsequently the vehicle is to drive to the parking position autonomously.

In yet another specific embodiment, it is provided that the vehicle detects, by sensors, at least one field marker included in the parking facility during the navigation, i.e., during its autonomous driving operation, an instantaneous position of the vehicle in the digital map being ascertained based on the detected field marker, the navigation being additionally carried out based on the ascertained instantaneous position.

This therefore means, in particular, that the parking facility includes a field marker at which the vehicle orients itself during the navigation or during its driving operation. As a result, this yields the technical advantage in particular that a navigation may be carried out even more efficiently. In particular, an ascertained route may be advantageously checked for correctness in this way. Preferably, several field markers are provided. A field marker is a visual field marker in particular, for example, a barcode. A field marker is an RFID sensor, for example.

In yet another specific embodiment, it is provided that the vehicle detects its surroundings by sensors during the navigation, the navigation being additionally carried out based on the detected surroundings.

As a result, this yields the technical advantage in particular that a navigation by the vehicle in the parking facility may be carried out particularly efficiently. In particular, the vehicle may advantageously detect obstacles, so that the vehicle may circumnavigate these obstacles.

A surroundings sensor system is provided for the detection. A surroundings sensor system includes, for example, one or several surroundings sensors such as, for example: ultrasonic sensor, LIDAR sensor, video sensor, or radar sensor.

A vehicle detects its surroundings with the aid of such a surroundings sensor system, the navigation being carried out, in particular, based on the detected surroundings. In this way, the vehicle may therefore detect obstacles, for example, and circumnavigate these obstacles. In this way, the vehicle may therefore detect, for example, with the aid of the surroundings sensor system, where the vehicle is located in the parking facility relative to the section or the further section of the digital map. One or several detected field markers are preferably utilized for this detection.

In one specific embodiment, the parking facility includes a WLAN, based on which the vehicle carries out the navigation, in particular a localization, in order to determine where the vehicle is located relative to the digital map.

According to one specific embodiment, the communication network includes a mobile communication network and/or a WLAN network.

In one specific embodiment, a communication will be or is encrypted via the communication network.

According to yet another specific embodiment, it is provided that the processor of the server is designed for ascertaining a route to the target position which lies within the parking facility based on the digital map, the communication interface being designed for transmitting the ascertained route to the vehicle via the communication network.

The communication via the communication network, in particular between the vehicle and the server, is preferably encrypted.

In one specific embodiment, a vehicle-external monitoring system is provided, which is designed for monitoring the vehicle during its driving operation in the parking facility. The server includes, for example, the monitoring system. Depending on the monitoring, it is provided, for example, that the subsections and/or the further sections are transmitted to the vehicle. This is the case because, with the aid of the monitoring system, according to one specific embodiment, a distance of the vehicle to one or several subsections and/or to one or several further sections may be determined or ascertained during its driving operation. In this way, one or several points in time at which the subsections and/or the further sections are transmitted to the vehicle may be advantageously determined or ascertained.

According to one specific embodiment, the monitoring system includes one or several video cameras and/or one or several radar sensors and/or one or several ultrasonic sensors and/or one or several LIDAR sensors and/or one or several laser sensors and/or one or several photoelectric barriers and/or one or several door-opening sensors.

Functionalities of the methods similarly result from corresponding functionalities of the device or the server, and vice versa. This means, therefore, that method features similarly result from corresponding device features or server features, and vice versa. This therefore means, in particular, that, when a feature is described in conjunction with the method or the device or the server, this feature may be similarly provided in specific embodiments of the methods, and vice versa.

The present invention is explained in greater detail in the following with reference to preferred exemplary embodiments.

Figure 2:
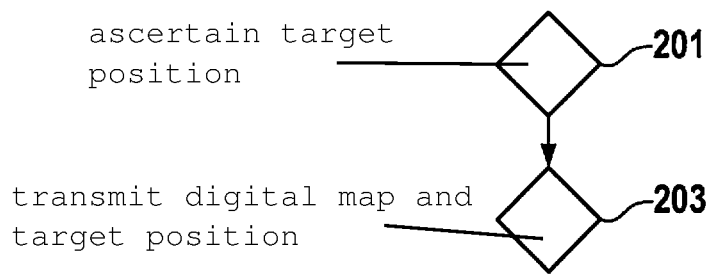
Figure 3:
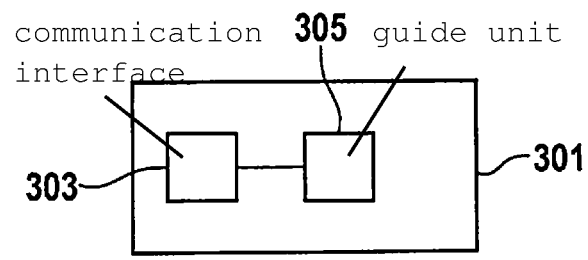
Figure 4:
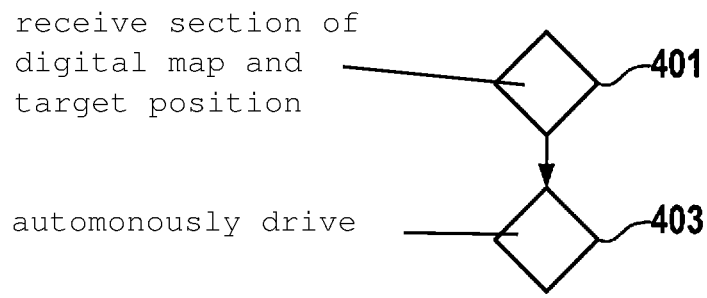
Figure 5:
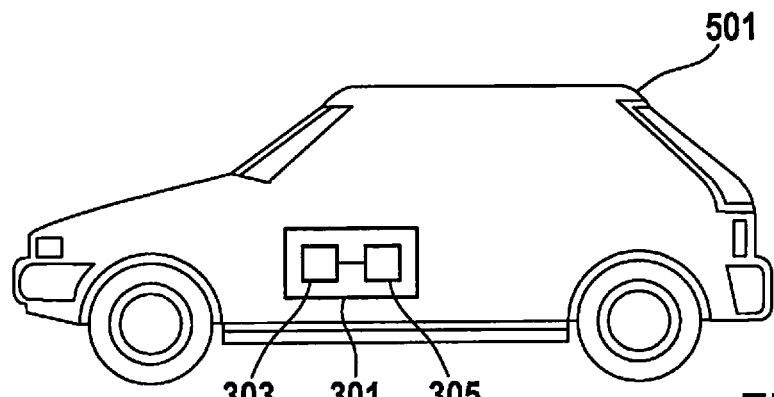
Figure 6:
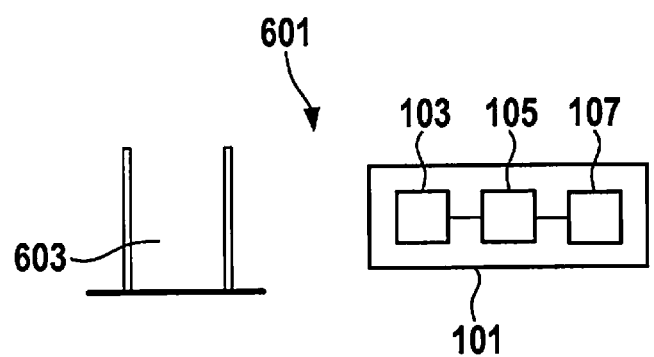
Figure 7:
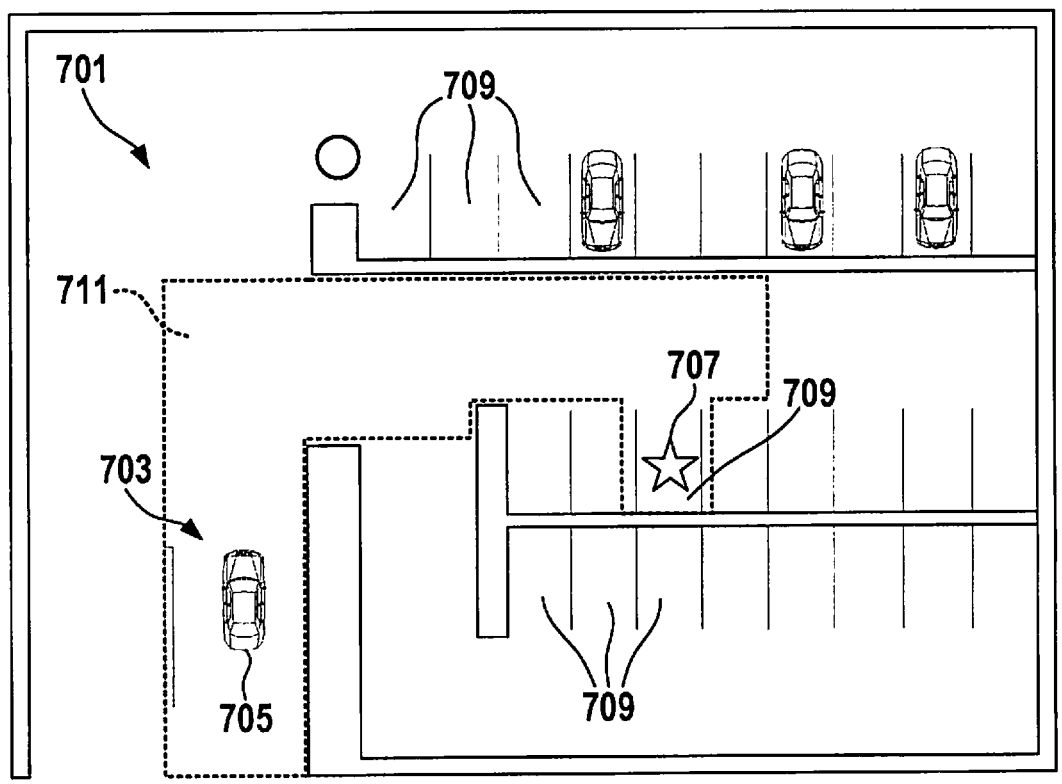
Figure 8:
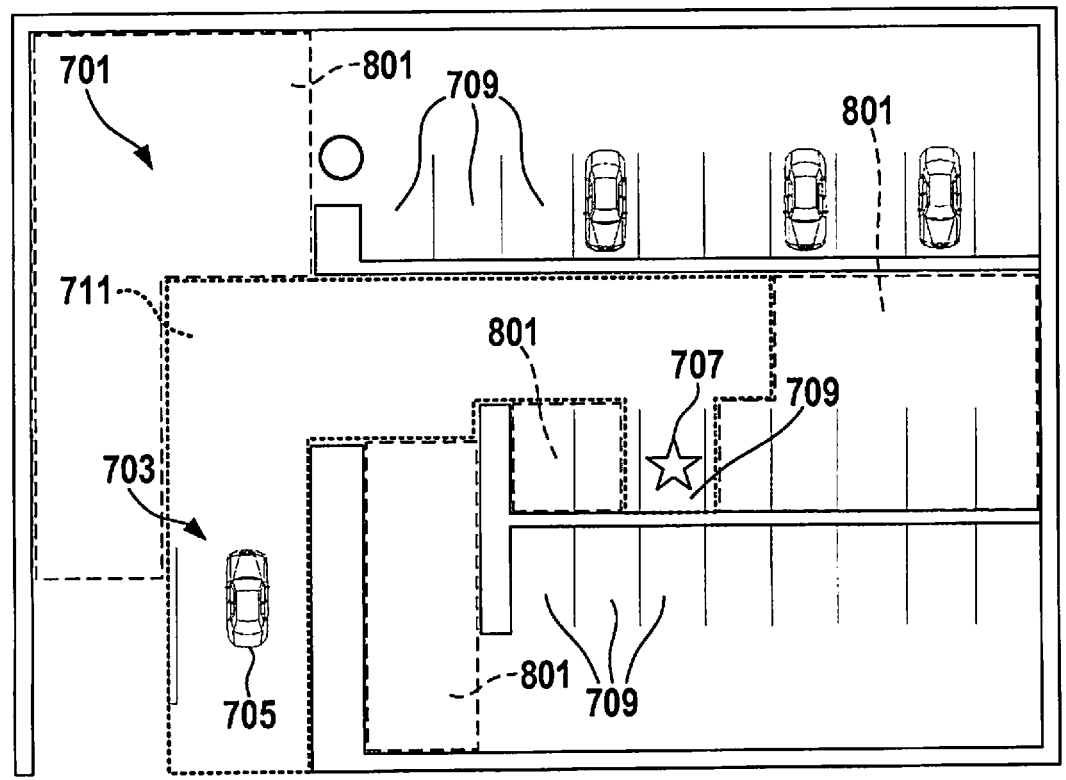
Figure 9:
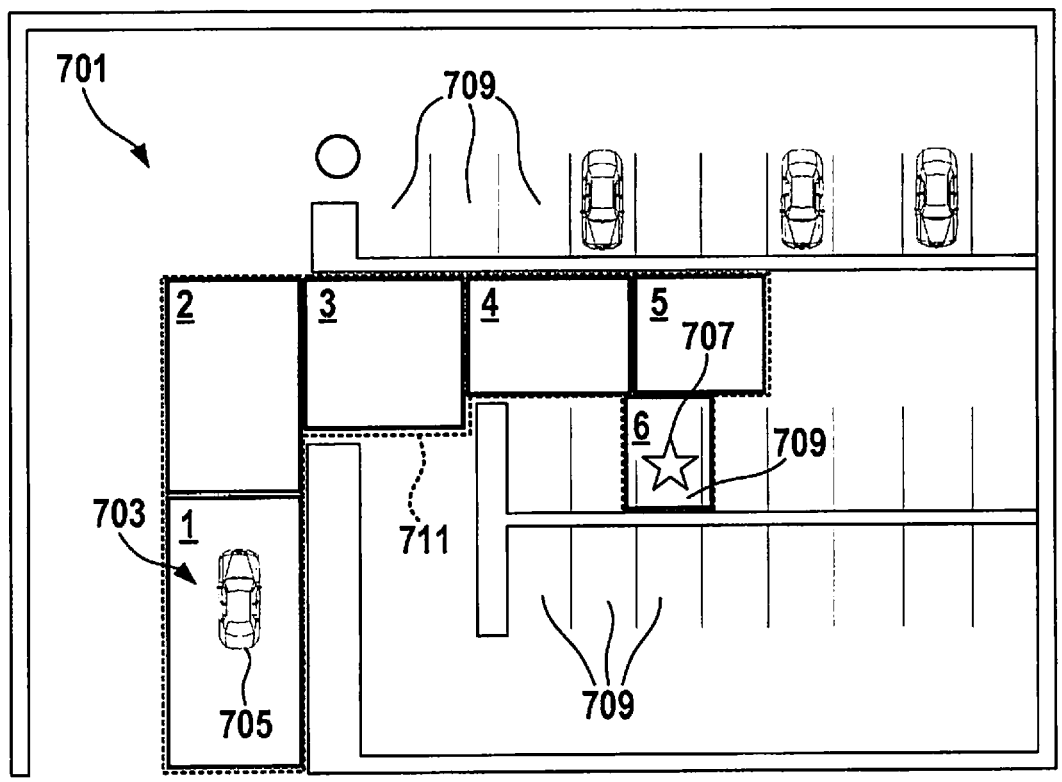

FIG. 1 shows a server for operating a parking facility,
FIG. 2 shows a method for operating a parking facility,
FIG. 3 shows a device for operating a vehicle,
FIG. 4 shows a method for operating a vehicle,
FIG. 5 shows a vehicle,
FIG. 6 shows a parking system,
FIG. 7 shows a parking facility including a plotted portion,
FIG. 8 shows the parking facility according to FIG. 7 including further plotted portions, and
FIG. 9 shows the parking facility according to FIG. 7, the portion being subdivided into sub-portions.

FIG. 1 shows a server 101 for operating a parking facility, including:
- a database 103 in which a digital map of a parking facility is stored,
- a processor 105 which is designed for ascertaining at least one target position for a vehicle in the parking facility and at least one section of the digital map which corresponds to a portion of the parking facility through which the vehicle is to drive autonomously during its driving operation to the target position, and
- a communication interface 107 which is designed for transmitting the section of the digital map and the target position to the vehicle via a communication network.

FIG. 2 shows a method for operating a parking facility, in which:
- at least one target position for a vehicle in the parking facility and at least one section of the digital map, which corresponds to a portion of the parking facility through which the vehicle is to drive autonomously during its driving operation to the target position, is ascertained 201 based on a digital map of a parking facility,
- the section of the digital map and the target position are transmitted 203 to the vehicle via a communication network.

FIG. 3 shows a device 301 for operating a parking facility, including:
- a communication interface 303 which is designed for receiving, via a communication network, at least one target position for the vehicle in the parking facility and at least one section of a digital map of the parking facility, which corresponds to a portion of the parking facility through which the vehicle is to drive autonomously during its driving operation to the target position, and
- a guide unit 305 which is designed for autonomously guiding the vehicle in the parking facility through the portion to the target position.

FIG. 4 shows a method for operating a vehicle, in which a section of a digital map of a parking facility and at least one target position in the parking facility are received 401 by the vehicle via a communication network, the section corresponding to a portion of the parking facility through which the vehicle is to drive, the vehicle autonomously drives 403 in the parking facility through the portion to the target position.

FIG. 5 shows a vehicle 501 which includes device 301 of FIG. 3.

FIG. 6 shows a parking system 601 for vehicles, parking system 601 including a parking facility 603 and server 101 of FIG. 1.

FIG. 7 shows a parking facility 701. Parking facility 701 includes a drop-off position 703 at which a vehicle 705 was dropped off. Vehicle 705 is to autonomously drive or navigate to a target position 707. Target position 707 is represented symbolically by a star.

In this case, target position 707 corresponds to a parking position in a parking area 709. Parking facility 701 includes a plurality of such parking areas 709.

One portion 711 of the parking facility is delimited. This portion 711 therefore does not correspond to entire parking facility 701. A section of a digital map of parking facility 709 corresponding to this portion 711 is transmitted to vehicle 705 via a communication network. The vehicle therefore has the necessary information which is generally necessary so that the vehicle may autonomously, i.e., automatically, drive to target position 707 from drop-off position 703.

FIG. 8 shows parking facility 701 of FIG. 7, additional further portions 801 which adjoin portion 711 also being delimited. Vehicle 705 will therefore drive past this further portion 801.

FIG. 9 shows parking facility 701 of FIG. 7, portion 711 being subdivided into sub-portions. These sub-portions are numbered consecutively as: 1, 2, 3, 4, 5 and 6. According to one specific embodiment, it is provided that the sub-portions are transmitted to vehicle 705 only during its autonomous driving operation in parking facility 701.

Several possible specific embodiments of the present invention are described in the following with reference to FIGS. 7 through 9.

According to FIG. 7, the basic concept according to the present invention is shown, namely that only the information from the digital map of parking facility 701 which is necessary for the autonomous driving operation of the vehicle to its target position 707 is transmitted to the vehicle. In this case, the digital map of parking facility 701 corresponds to the entire image according to FIG. 7. According to the present invention, it is provided in this case that only one portion, the portion labeled with reference numeral 711, i.e., the corresponding data, is transmitted to the vehicle.

Therefore, only the information from the digital map which is necessary for the actions (autonomous driving operation, parking, unparking) carried out by vehicle 705 is transmitted to vehicle 705.

FIG. 8 shows yet another idea according to the present invention, for the case in which, and, according to one specific embodiment, in particular, if necessary, that adjacent areas are additionally transmitted, in particular upon request, i.e., in particular, in response to a request by vehicle 705 or by a driver.

According to yet another specific embodiment, these areas 801 are ascertained with a reduced accuracy and, in this regard, further portions 801 are transmitted to the vehicle with a reduced accuracy. This means, therefore, that portion 711 has a high accuracy. Further portions 801 have a comparatively reduced accuracy.

In yet another specific embodiment, it is provided that portion 711 is subdivided into sub-portions 1, 2, 3, 4, 5, 6. This is shown by way of example in FIG. 9. As a result, a necessary memory in the vehicle may be advantageously reduced for the present task/position of the entire sequence, i.e., of the autonomous driving operation of the vehicle to the target position in general. The reduction includes the fact, in particular, that always only subsections 1, 2, 3, 4, 5, 6 are transmitted in succession.

This means, for example, that only the subsections which correspond to sub-portions 1 and 2 are transmitted to the vehicle at the beginning of the autonomous driving operation. If the vehicle is in sub-portion 2, it is provided that the subsection corresponding to sub-portion 3 is reloaded by the vehicle or is transmitted to the vehicle, so that the vehicle may then delete the subsection corresponding to sub-portion 1 from its memory, which is therefore also provided according to one specific embodiment. This then continues correspondingly for sub-portions 4, 5, and 6. An iterative transmission of the subsections is therefore provided in general according to one specific embodiment. In this case, "iterative" means, in particular, in succession and during the driving operation, in particular upon request by the vehicle, preferably dependent on an instantaneous position of the vehicle in the parking facility.

During the trip from target position 707 back to drop-off position 703, the individual subsections of the digital map are then transmitted to the vehicle in reverse order, i.e., beginning with 6, 5, 4, 3, 2, 1.

In yet another specific embodiment, the ideas according to FIGS. 8 and 9 may be combined with one another. This means, therefore, that the corresponding specific embodiments may be combined with one another. This means, therefore, for example, that further portions 801 are transmitted only during the driving operation of the vehicle from drop-off position 703 to target position 707, the subsections corresponding to sub-portions 1, 2, 3, 4, 5, 6 also being simultaneously transmitted to the vehicle only during the driving operation of the vehicle, i.e., as described above.

In yet another specific embodiment, it is provided, for example, that the portions or further portions which are not yet needed are transmitted with reduced accuracy. This means, therefore, when portions 1 and 2 are required, these portions are transmitted with high accuracy, portion 3 also being simultaneously transmitted with reduced accuracy. Sub-portion 3, i.e., the corresponding subsection, is transmitted with high accuracy only when the vehicle is located in sub-portion 2.

Specific embodiments which are not shown include one or several of the following exemplary features:
- The vehicle is dropped off at the drop-off point or drop-off position (also referred to as the "dropping zone").
- A parking facility management system transmits to the vehicle a section of a highly accurate parking garage map/parking facility map (digital map) (for example, also in advance, i.e., before the vehicle is dropped off at the drop-off point).
- A parking facility management system transmits to the vehicle a reserved target position for parking (for example, also in advance, i.e., before the vehicle is dropped off at the drop-off point).
- The vehicle calculates or ascertains a route to the target parking space (target position) and/or the parking facility management system calculates or ascertains the route to the target parking space and transmits this to the vehicle.
- The vehicle follows the route to the target position.
- Along the route (during the navigation), the vehicle ascertains its location with the aid of
  the section of the digital map, preferably in conjunction with
  field markers, for example, (see above), which are detected with the aid of the vehicle's own sensor system (surroundings sensor system of the vehicle) and evaluated and/or
  preferably WLAN, and/or
  preferably on-board sensors (video, radar, LIDAR, etc.).
- Any obstacles on the route are detected by the on-board sensors, in particular the surroundings sensor system, and are circumnavigated or are stopped in front thereof, as necessary.
- The vehicle parks in the parking position, for example, with the aid of a parking assistant.
- The trip from the parking facility back to the drop-off point is carried out in a similar way.

In one specific embodiment, the parking garage/the parking facility includes a separate reserved area for the fully automatic or autonomous valet parking. As a result, possible problems resulting from mixed traffic or pedestrians, etc., may be circumvented.

In one first expansion stage (i.e., in one specific embodiment), the parking garage/the parking facility may reserve a separate area for the fully automatic valet parking. As a result, possible problems resulting from mixed traffic or pedestrians, etc., may be circumvented.

In yet another specific embodiment, the parking facility management system, i.e., the server, in particular, monitors the driving operation of the vehicle the entire time with the aid of a parking facility monitoring system (e.g., via video cameras). According to one specific embodiment, if problems occur, the parking facility management system may interrupt the driving operation with the aid of a "stop signal."

According to one specific embodiment, the transfer of information is carried out, preferably in an encrypted manner, by C2X systems (for example, via WLAN).

What is claimed is:

1. A server for operating a parking facility, comprising:
a database in which a digital map of a parking facility is stored;
a processor designed for ascertaining at least one target position for a vehicle in the parking facility and at least one section of the digital map which corresponds to a portion of the parking facility through which the vehicle is to drive autonomously during its driving operation to the target position; and
a communication interface designed for transmitting the section of the digital map and the target position to the vehicle via a communication network, wherein the section of the digital map transmitted to the vehicle covers less than an entire area of the parking facility, wherein the processor is designed for subdividing the section into subsections, each of which corresponds to one sub-portion of the portion, the communication interface being designed for transmitting at least some of the subsections via the communication network only during the autonomous driving operation of the vehicle to the target position, the at least some subsections corresponding to sub-portions through which the vehicle must still drive during its autonomous driving operation to the target position, and wherein the processor is designed for ascertaining the subsections with a different accuracy depending on a distance of the vehicle to a particular sub-portion during its autonomous driving operation.

2. The server as recited in claim 1, wherein the portion is formed as one contiguous area extending from a start position to the target position.

3. The server as recited in claim 1, wherein the processor is designed for ascertaining a route to the target position, which lies within the parking facility and extends through the portion, based on the digital map, the communication interface being designed for transmitting the ascertained route to the vehicle via the communication network.

4. The server as recited in claim 1, wherein the at least one target position includes at least one of: i) a drop-off position at which a driver of the vehicle may drop off the vehicle for an autonomous parking process, ii) a parking position at which the vehicle is to autonomously park, and ii) a pick-up position at which a driver of the vehicle is to pick up the vehicle at the end of parking.

5. The server as recited in claim 1, wherein the processor is designed for ascertaining at least one further section of the digital map which corresponds to one further portion of the parking facility, past which the vehicle is to drive during its autonomous driving operation to the target position, the communication interface being designed for transmitting the further section to the vehicle via the communication network.

6. The server as recited in claim 5, wherein the processor is designed for ascertaining the further section with reduced accuracy as compared to the section.

7. The server as recited in claim 5, wherein the communication interface is designed for transmitting the further section to the vehicle via the communication network depending on a distance of the vehicle during its autonomous driving operation to the further section.

8. A method for operating a parking facility, comprising: ascertaining at least one target position for a vehicle in the parking facility, and at least one section of a digital map which corresponds to a portion of the parking facility through which the vehicle is to drive autonomously during its driving operation to the target position, the ascertaining being based on the digital map of a parking facility; and transmitting the section of the digital map and the target position to the vehicle via a communication network, wherein the section of the digital map transmitted to the vehicle covers less than an entire area of the parking facility, wherein the method also comprises subdividing the section into subsections, each of which corresponds to one sub-portion of the portion, a communication interface being designed for transmitting at least some of the subsections via the communication network only during the autonomous driving operation of the vehicle to the target position, the at least some subsections corresponding to sub-portions through which the vehicle must still drive during its autonomous driving operation to the target position, and wherein the subsections are ascertained with a different accuracy depending on a distance of the vehicle to a particular sub-portion during its autonomous driving operation.

9. A method for operating a vehicle, comprising:
receiving, by the vehicle via a communication network, a section of a digital map of a parking facility and at least one target position in the parking facility, the section corresponding to a portion of the parking facility through which the vehicle is to drive; and
autonomous driving, by the vehicle, in the parking facility through the portion to the target position, wherein the section of the digital map received by the vehicle covers less than an entire area of the parking facility, wherein the section is subdivided into subsections, each of which corresponds to one sub-portion of the portion, a communication interface being designed for transmitting at least some of the subsections via the communication network only during the autonomous driving operation of the vehicle to the target position, the at least some subsections corresponding to sub-portions through which the vehicle must still drive during its autonomous driving operation to the target position, and wherein the subsections are ascertained with a different accuracy depending on a distance of the vehicle to a particular sub-portion during its autonomous driving operation.

10. A vehicle including a device for operating a vehicle, the device comprising:
a communication interface designed for receiving, via a communication network, at least one target position for the vehicle in the parking facility, and at least one section of a digital map of the parking facility which corresponds to a portion of the parking facility through which the vehicle is to drive autonomously during its driving operation to the target position; and
a guide unit designed for autonomously guiding the vehicle in the parking facility through the portion to the target position, wherein the section of the digital map received by the vehicle covers less than an entire area of the parking, wherein the section is subdivided into subsections, each of which corresponds to one sub-portion of the portion, the communication interface being designed for transmitting at least some of the subsections via the communication network only during the autonomous driving operation of the vehicle to the target position, the at least some subsections corresponding to sub-portions through which the vehicle must still drive during its autonomous driving operation to the target position, and wherein the subsections are ascertained with a different accuracy depending on a distance of the vehicle to a particular sub-portion during its autonomous driving operation.

11. A device for operating a vehicle, comprising:
a communication interface designed for receiving, via a communication network, at least one target position for the vehicle in the parking facility, and at least one section of a digital map of the parking facility which corresponds to a portion of the parking facility through which the vehicle is to drive autonomously during its driving operation to the target position; and
a guide unit designed for autonomously guiding the vehicle in the parking facility through the portion to the target position, wherein the section of the digital map received by the vehicle covers less than an entire area of the parking facility, wherein the section is subdivided into subsections, each of which corresponds to one sub-portion of the portion, the communication interface being designed for transmitting at least some of the subsections via the communication network only during the autonomous driving operation of the vehicle to the target position, the at least some subsections corresponding to sub-portions through which the vehicle must still drive during its autonomous driving operation to the target position, and wherein the subsections are ascertained with a different accuracy depending on a distance of the vehicle to a particular sub-portion during its autonomous driving operation.

12. The device as recited in claim 11, wherein the portion is formed as one contiguous area extending from a start position to the target position.

13. The device as recited in claim 11, wherein the communication interface is designed for receiving, via the communication network, subsections subdividing the section, each subsection corresponding to one sub-portion of the portion, the communication interface being designed for receiving at least some of the subsections via the communication network only during the autonomous driving operation of the vehicle to the target position, the at least some subsections corresponding to sub-portions through which the vehicle must still drive during its autonomous driving operation to the target position.

14. The device as recited in claim 11, wherein the communication interface is designed for receiving, via the communication network, at least one further section of the digital map, which corresponds to one further portion of the parking facility, past which the vehicle is to drive during its autonomous driving operation to the target position, the guide unit being designed for guiding the vehicle past the further section.

15. The device as recited in claim 11, wherein the at least one target position includes at least one of: i) a drop-off position at which a driver of the vehicle may drop off the vehicle for an autonomous parking process, ii) a parking position at which the vehicle is to autonomously park, and iii) a pick-up position at which a driver of the vehicle is to pick up his/her vehicle at the end of parking, and wherein the guide device is designed for at least one of stopping, parking, and unparking the vehicle, at the corresponding positions.

16. A parking system for vehicles, comprising:
a parking facility; and
a server for operating the parking facility, the server including a database in which a digital map of a parking facility is stored, a processor designed for ascertaining at least one target position for a vehicle in the parking facility and at least one section of the digital map which corresponds to a portion of the parking facility through which the vehicle is to drive autonomously during its driving operation to the target position, and a communication interface designed for transmitting the section of the digital map and the target position to the vehicle via a communication network, wherein the section of the digital map transmitted to the vehicle covers less than an entire area of the parking, wherein the processor is designed for subdividing the section into subsections, each of which corresponds to one sub-portion of the portion, the communication interface being designed for transmitting at least some of the subsections via the communication network only during the autonomous driving operation of the vehicle to the target position, the at least some subsections corresponding to sub-portions through which the vehicle must still drive during its autonomous driving operation to the target position, and wherein the processor is designed for ascertaining the subsections with a different accuracy depending on a distance of the vehicle to a particular sub-portion during its autonomous driving operation.

17. A non-transitory computer readable storage medium on which is stored a computer program including program code for operating a parking facility, the program code, when executed by a computer, causing the computer to perform:
ascertaining at least one target position for a vehicle in the parking facility, and at least one section of a digital map which corresponds to a portion of the parking facility through which the vehicle is to drive autonomously during its driving operation to the target position, the ascertaining being based on the digital map of a parking facility; and
transmitting the section of the digital map and the target position to the vehicle via a communication network, wherein the section of the digital map transmitted to the vehicle covers less than an entire area of the parking, wherein the section is subdivided into subsections, each of which corresponds to one sub-portion of the portion, a communication interface being designed for transmitting at least some of the subsections via the communication network only during the autonomous driving operation of the vehicle to the target position, the at least some subsections corresponding to sub-portions through which the vehicle must still drive during its autonomous driving operation to the target position, and wherein the subsections are ascertained with a different accuracy depending on a distance of the vehicle to a particular sub-portion during its autonomous driving operation.

18. A non-transitory computer readable storage medium on which is stored a computer program including program code for operating a vehicle, the program code, when executed by a computer, causing the computer to perform:
receiving, by the vehicle via a communication network, a section of a digital map of a parking facility and at least one target position in the parking facility, the section corresponding to a portion of the parking facility through which the vehicle is to drive; and
autonomous driving, by the vehicle, in the parking facility through the portion to the target position, wherein the section of the digital map received by the vehicle covers less than an entire area of the parking, wherein the section is subdivided into subsections, each of which corresponds to one sub-portion of the portion, a communication interface being designed for transmitting at least some of the subsections via the communication network only during the autonomous driving operation of the vehicle to the target position, the at least some subsections corresponding to sub-portions through which the vehicle must still drive during its autonomous driving operation to the target position, and wherein the subsections are ascertained with a different accuracy depending on a distance of the vehicle to a particular sub-portion during its autonomous driving operation.

* * * * *